(12) United States Patent
Ito

(10) Patent No.: US 12,429,667 B2
(45) Date of Patent: Sep. 30, 2025

(54) LENS APPARATUS, IMAGE CAPTURING APPARATUS, AND IMAGE CAPTURING SYSTEM

(71) Applicant: CANON KABUSHIKI KAISHA, Tokyo (JP)

(72) Inventor: Shu Ito, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 786 days.

(21) Appl. No.: 17/567,728

(22) Filed: Jan. 3, 2022

(65) Prior Publication Data

US 2022/0229265 A1 Jul. 21, 2022

(30) Foreign Application Priority Data

Jan. 15, 2021 (JP) ................... 2021-004607

(51) Int. Cl.
  *G02B 7/09* (2021.01)
  *G02B 7/10* (2021.01)
  *G03B 17/14* (2021.01)

(52) U.S. Cl.
  CPC ............. *G02B 7/09* (2013.01); *G02B 7/102* (2013.01); *G03B 17/14* (2013.01)

(58) Field of Classification Search
  CPC .......... G02B 7/09; G02B 7/102; G02B 7/021; G02B 7/10; G03B 17/14
  See application file for complete search history.

(56) References Cited

U.S. PATENT DOCUMENTS

| 2010/0060995 A1* | 3/2010 | Yumiki | H04N 23/69 359/823 |
| 2016/0202448 A1* | 7/2016 | Okada | G02B 7/102 359/701 |
| 2021/0181458 A1* | 6/2021 | Shimizu | G02B 7/102 |
| 2023/0069519 A1* | 3/2023 | Kishimoto | G02B 7/021 |

FOREIGN PATENT DOCUMENTS

| JP | 2010243900 A | 10/2010 |
| JP | 2014016513 A | 1/2014 |
| JP | 2019113649 A | 7/2019 |

* cited by examiner

Primary Examiner — Thomas K Pham
Assistant Examiner — Jennifer A Jones
(74) Attorney, Agent, or Firm — Canon U.S.A., Inc. IP Division

(57) ABSTRACT

A lens apparatus includes a drive unit to drive a second lens barrel in an optical axis direction, a connection member to connect the second lens barrel and the drive unit, a movement base to hold the drive unit and move the drive unit in the optical axis direction with respect to a first lens barrel, and a second urging member to urge the movement base against the first lens barrel in a direction orthogonal to a plane passing through first, second, and third support portions. The connection member moves in a direction intersecting with a line connecting the first and second support portions. A moment by an urging force of the second urging member about an axis connecting the first and second support portions is greater than a moment by an urging force of the first urging member about the axis connecting the first and second support portions.

19 Claims, 13 Drawing Sheets

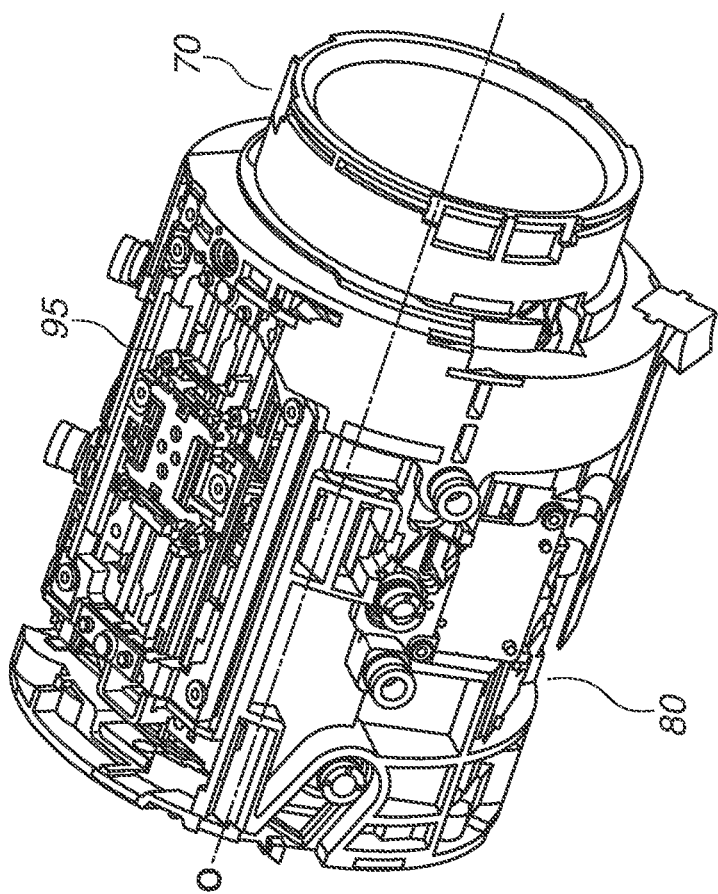
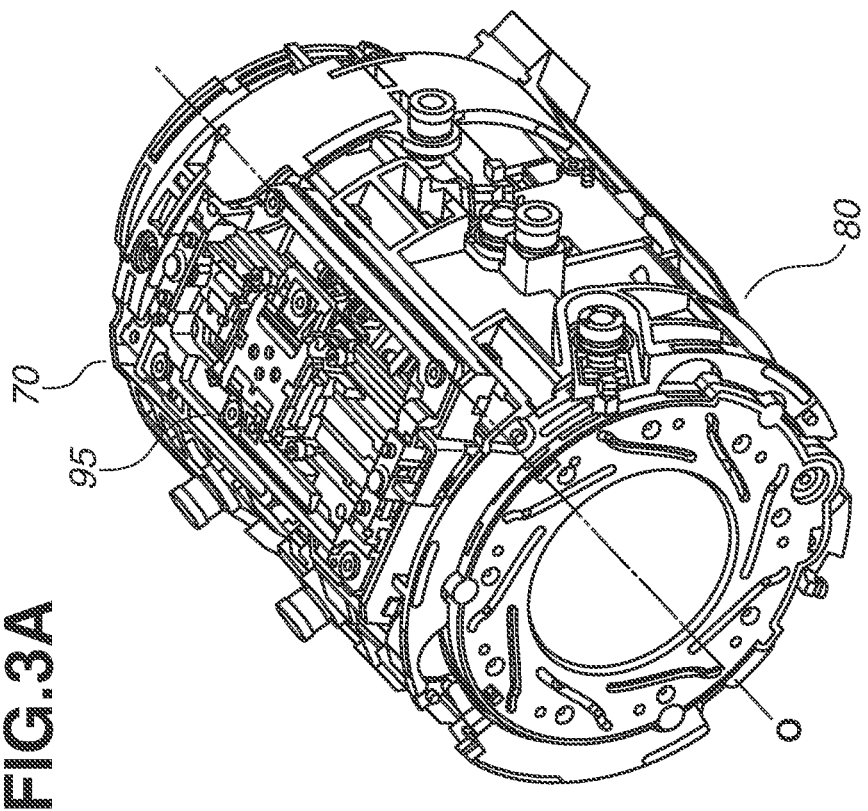

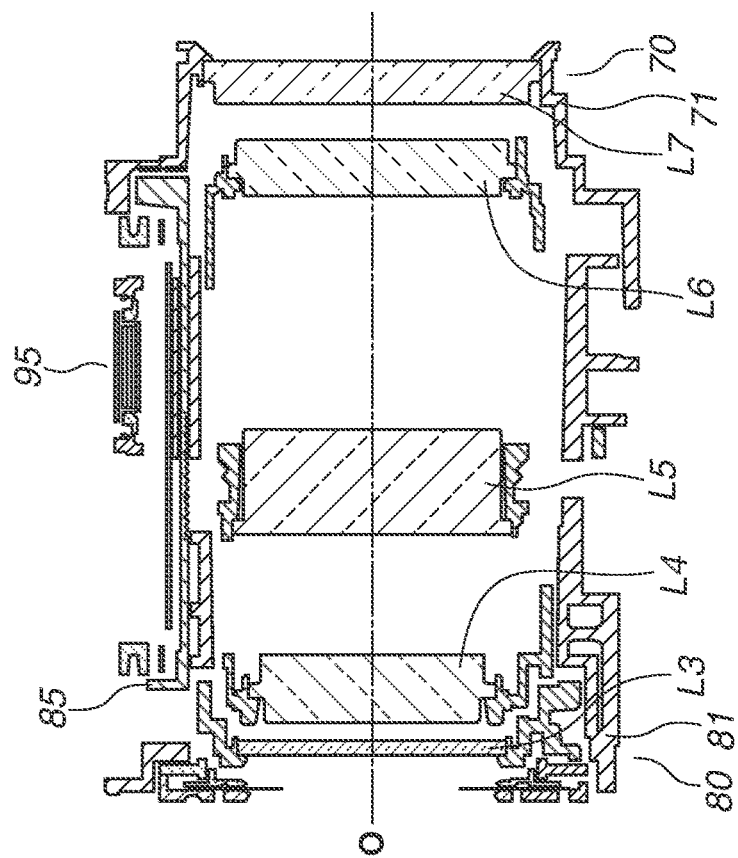
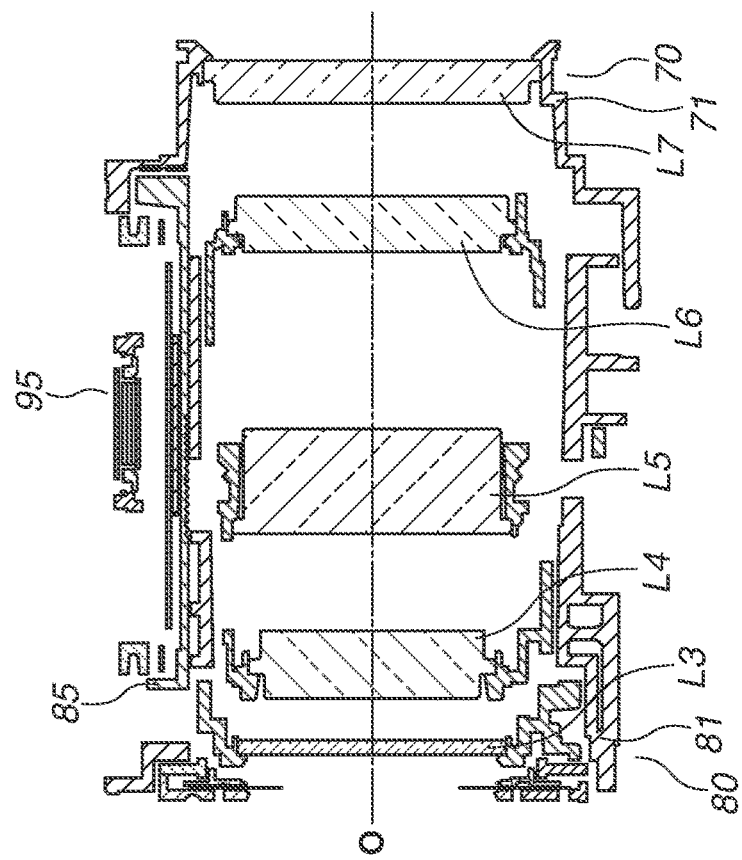

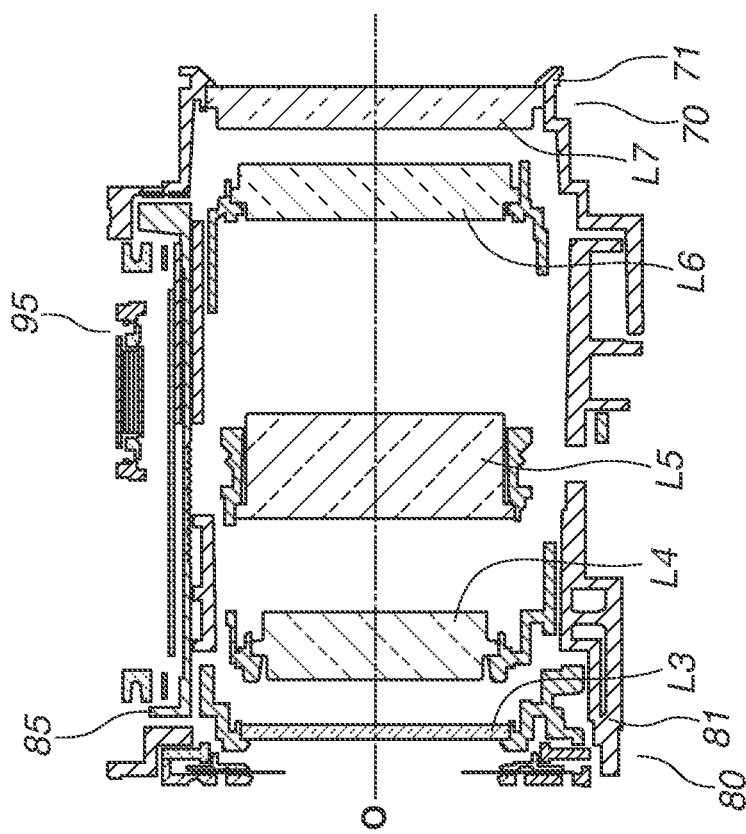
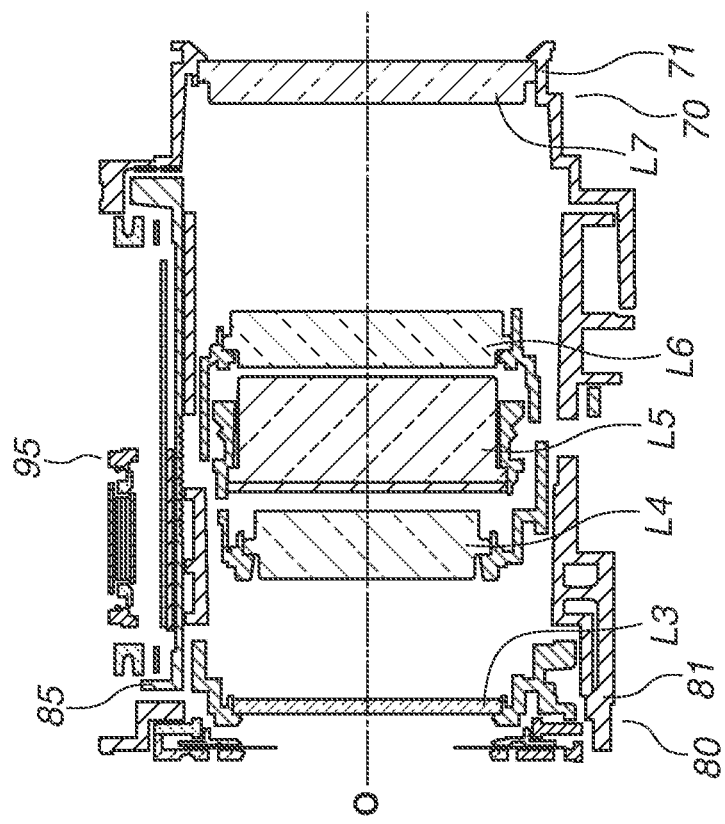

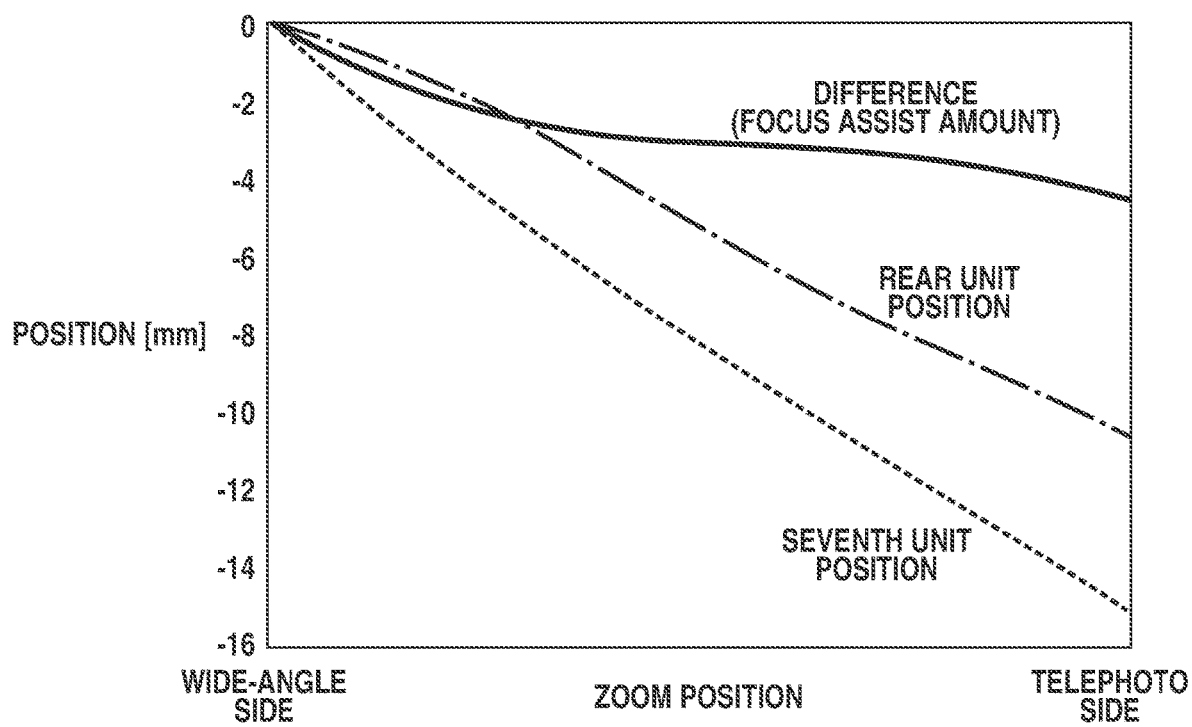

LENS APPARATUS, IMAGE CAPTURING APPARATUS, AND IMAGE CAPTURING SYSTEM

BACKGROUND OF THE DISCLOSURE

Field of the Disclosure

The aspect of the embodiments relates to a lens apparatus, an image capturing apparatus, and an image capturing system.

Description of the Related Art

Some lens apparatuses that drive a lens in the optical axis direction by using an actuator such as a motor have a lens drive assist configuration in which the lens can be driven with respect to the base member that can be driven in the optical axis direction by a user's rotation operation of the cam ring. This lens drive assist configuration makes it possible to drive the lens by the total drive amount of a drive amount of the base member (base drive amount) and a drive amount of the lens (motor drive amount) with respect to the base member.

Japanese Patent Application Laid-Open No. 2014-16513 discusses a technique of controlling a motor using electronic cam data to move the focus lens to correct focus variations with movement of a variable power lens.

The electronic cam data is data indicating positions of the focus lens (in-focus position) where the variable power lens (zoom position) is in focus at individual subject distances.

However, as in the electronic cam data discussed in Japanese Patent Application Laid-Open No. 2014-16513, in general, the difference is large between the in-focus position at infinity at the wide-angle end of the zoom position and the in-focus position at a close distance at the telephoto end. When the focus lens is driven by the above-described lens drive assist configuration according to such electronic cam data, the base drive amount (cam lift) between the wide-angle end and the telephoto end is constant regardless of subject distances, for which a larger motor drive amount for the focus lens is more suitable, which will lead to a larger lens apparatus.

SUMMARY OF THE DISCLOSURE

According to an aspect of the embodiments, a lens apparatus includes a first lens unit configured to move in an optical axis direction in zooming, a second lens unit configured to move in the optical axis direction in zooming and focusing, a second lens barrel configured to hold the second lens unit, a first lens barrel configured to hold the first lens unit and a guide bar, the guide bar being configured to hold the second lens barrel movably in the optical axis direction, a drive unit configured to drive the second lens barrel in the optical axis direction in focusing, a connection member configured to connect the second lens barrel and the drive unit, a first urging member configured to urge the connection member against the drive unit and urge the second lens barrel against the guide bar, a movement base configured to hold the drive unit and move the drive unit in the optical axis direction with respect to the first lens barrel, and a second urging member configured to urge the movement base in a direction orthogonal to a plane passing through a first support portion, a second support portion, and a third support portion, the first support portion, the second support portion, and the third support portion being configured to support the movement base in a direction orthogonal to the optical axis on the first lens barrel. The connection member moves in a direction intersecting with a line connecting the first support portion and the second support portion as viewed in the direction orthogonal to the plane passing through the first support portion, the second support portion, and the third support portion. A moment by an urging force of the second urging member about an axis connecting the first support portion and the second support portion is greater than a moment by an urging force of the first urging member about the axis connecting the first support portion and the second support portion.

Further features of the disclosure will become apparent from the following description of exemplary embodiments with reference to the attached drawings.

BRIEF DESCRIPTION OF THE DRAWINGS

FIGS. 3A and 3B are perspective views each illustrating a rear unit according to the exemplary embodiment.

FIGS. 6A and 6B are sectional views each illustrating a configuration of the rear unit at the wide-angle end according to the exemplary embodiment.

FIGS. 7A and 7B are sectional views each illustrating a configuration of the rear unit at the telephoto end according to the exemplary embodiment.

FIG. 10 is a graph illustrating positions of the rear unit and the seventh unit and the difference between the positions according to the exemplary embodiment.

DESCRIPTION OF THE EMBODIMENTS

Some exemplary embodiments of the disclosure will be described in detail below with reference to the accompanying drawings. Like numbers refer to like members throughout the drawings, and redundant descriptions will be omitted.

Figure 1:
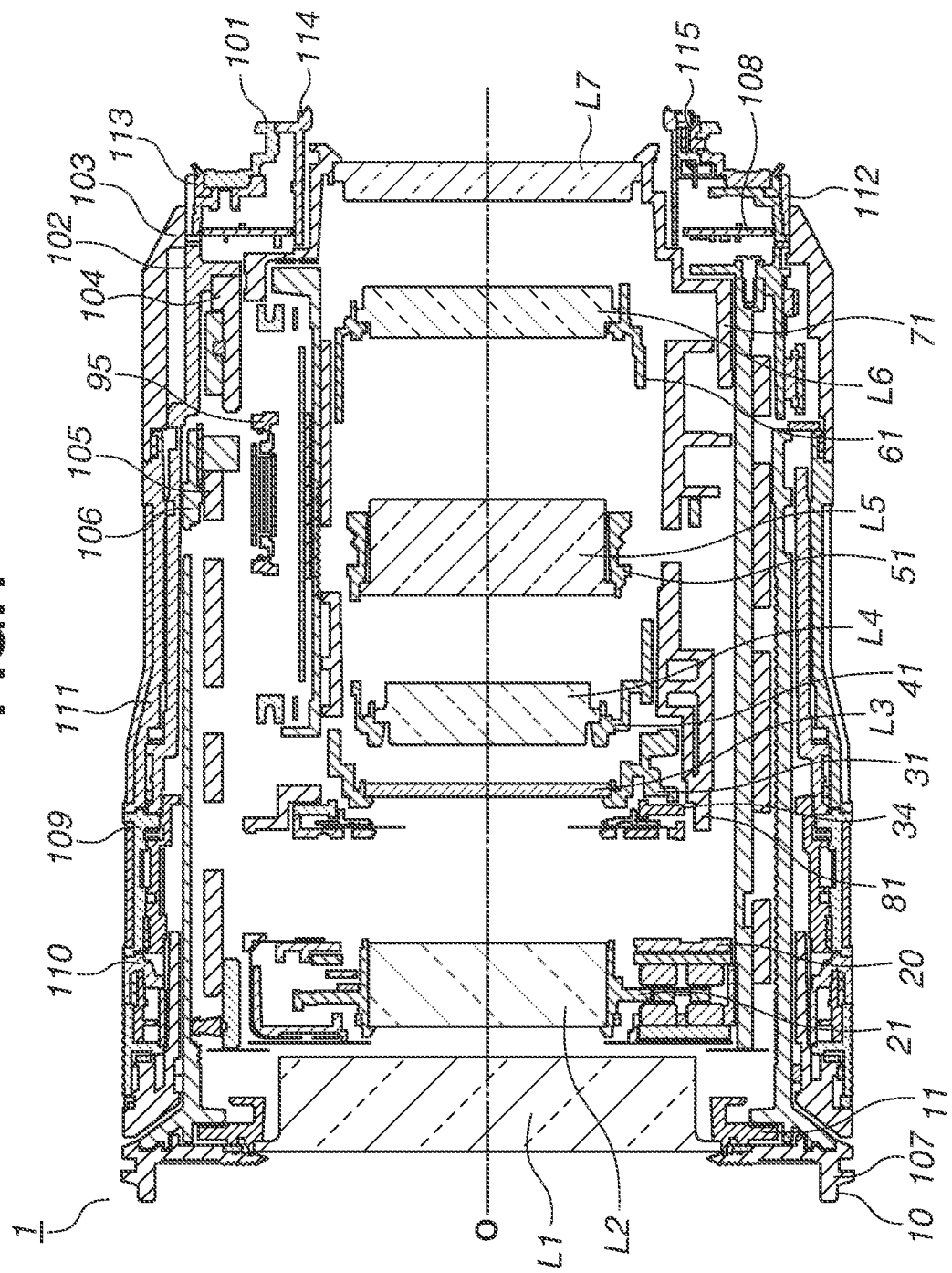
FIG. 1 is a sectional view illustrating a configuration of an interchangeable lens at the wide-angle end according to an exemplary embodiment of the disclosure.
Figure 2:
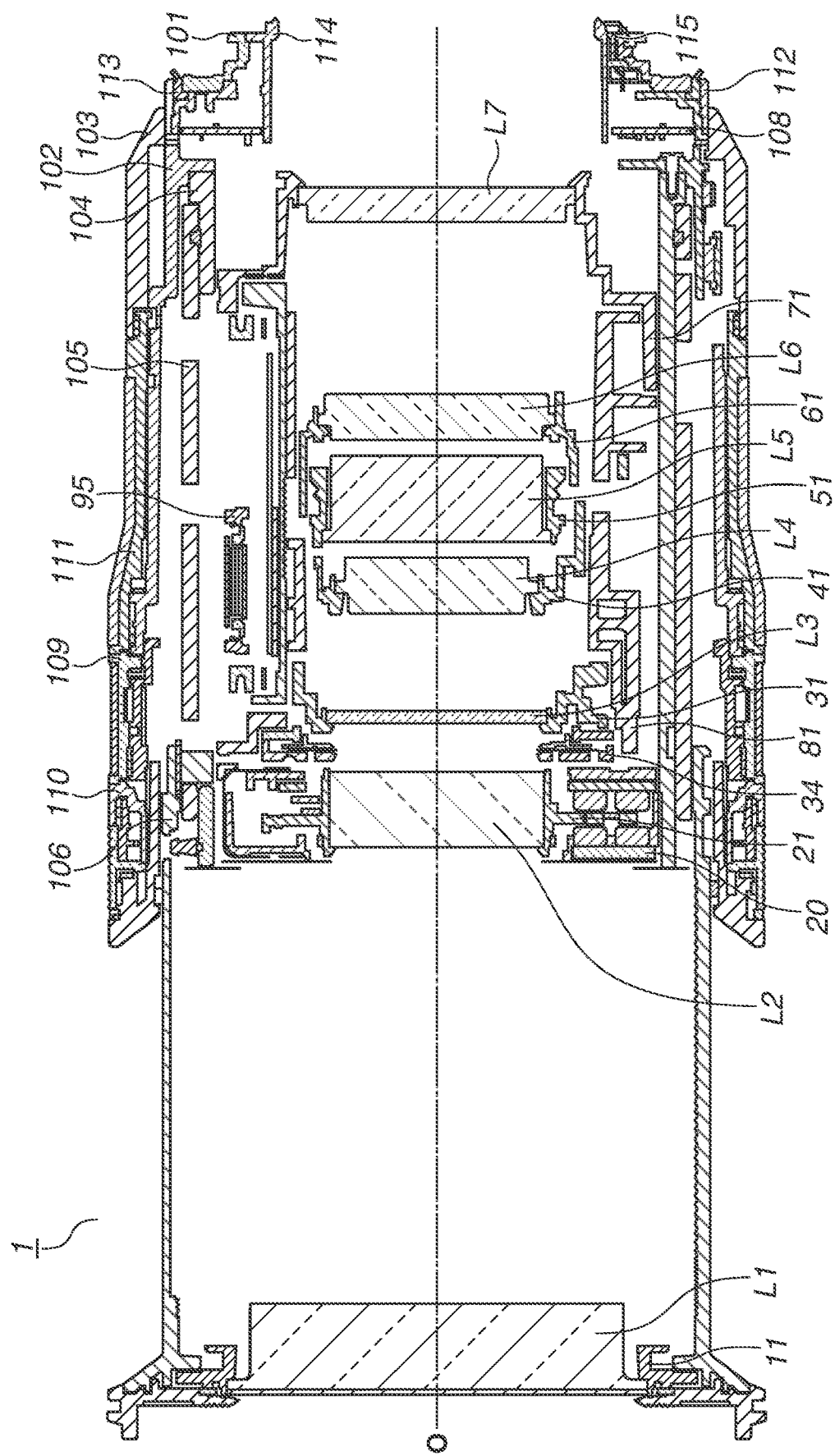
FIG. 2 is a sectional view illustrating a configuration of the interchangeable lens at the telephoto end according to the exemplary embodiment.
Figure 4:
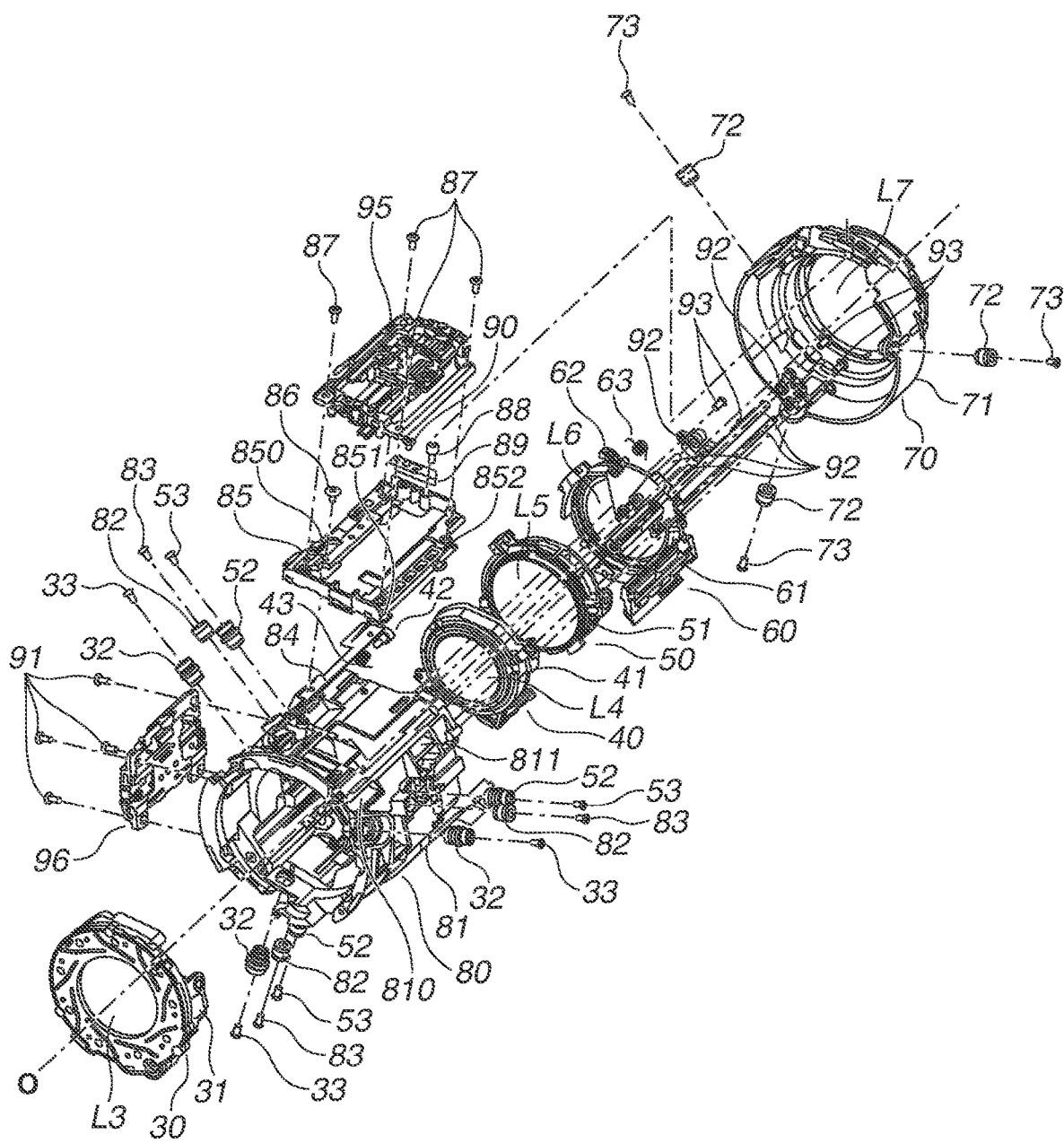
FIG. 4 is an exploded perspective view illustrating the rear unit in the interchangeable lens according to the exemplary embodiment.
Figure 5:
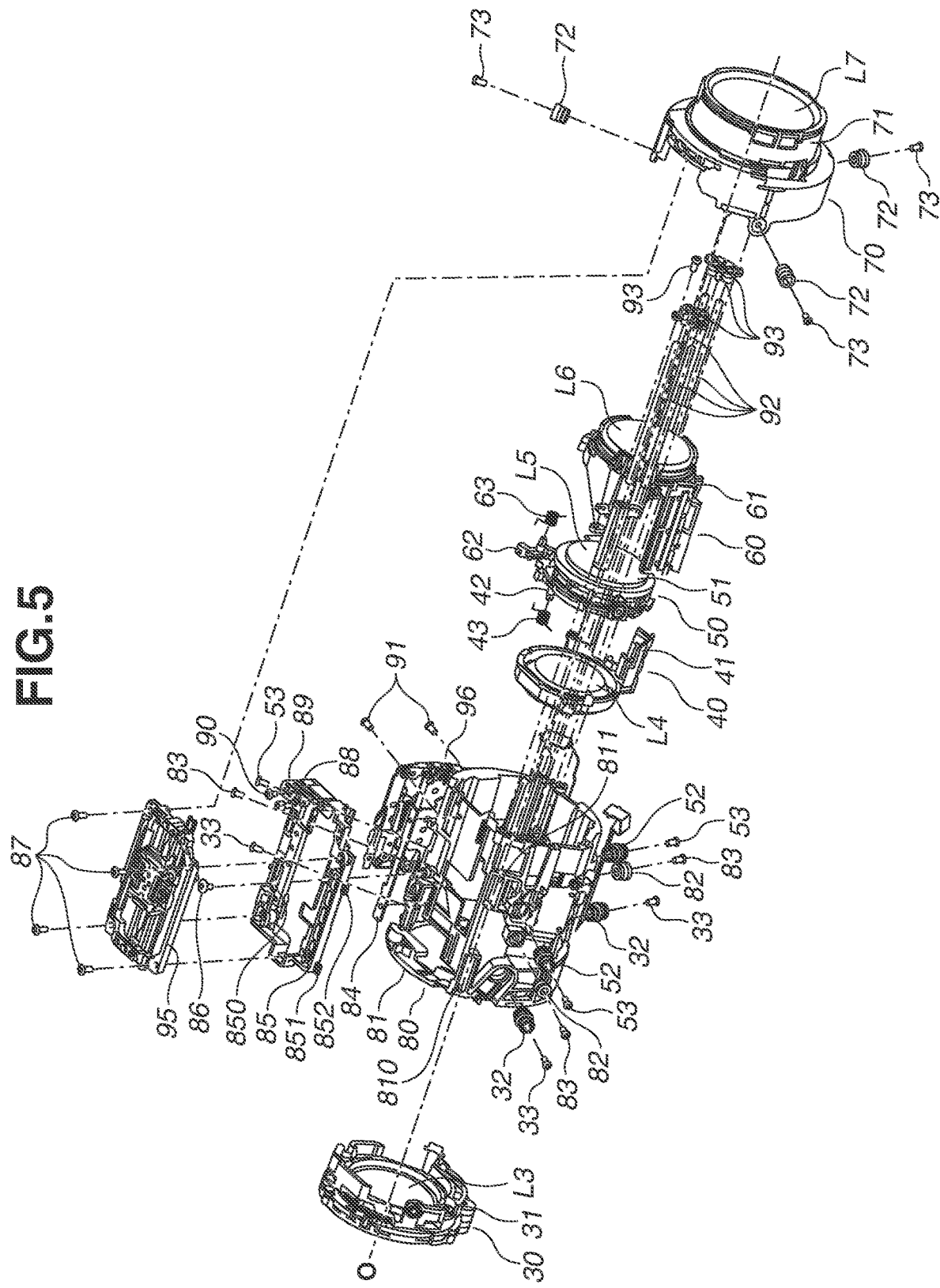
FIG. 5 is an exploded perspective view illustrating the rear unit in the interchangeable lens according to the exemplary embodiment.

FIGS. 1 and 2 each illustrate a configuration of an interchangeable lens 1 as a lens apparatus according to an exemplary embodiment of the disclosure. FIG. 1 is a sectional view of the interchangeable lens 1 at the wide-angle end taken along a line parallel to the optical axis. FIG. 2 is a sectional view of the interchangeable lens 1 at the telephoto end taken along a line parallel to the optical axis. FIG. 3 is a perspective view of a rear unit 80. FIGS. 4 and 5 are exploded perspective views each illustrating the rear unit 80 in the interchangeable lens 1 according to the exemplary embodiment of the disclosure.

(Configuration of Interchangeable Lens)

The interchangeable lens 1 is detachably mounted on a camera body serving as an image capturing apparatus (not illustrated) including an image sensor such as a charge-coupled device (CCD) sensor or a complementary metal-oxide semiconductor (CMOS) sensor. The interchangeable lens 1 includes an image capturing optical system composed of a first lens unit L1, a second lens unit L2, a third lens unit L3, a fourth lens unit L4, a fifth lens unit L5, a sixth lens unit L6, and a seventh lens unit L7, which are arranged in order from nearer the subject (front side). The image capturing optical system focuses light from a subject (not illustrated) on the image sensor in the camera body to thereby form a subject image. A floating lens unit as the fourth lens unit L4 and a focus lens unit as the sixth lens unit L6 move in the optical axis direction to perform focusing. The first to seventh lens units L1 to L7 move in the optical axis direction to perform zooming. The present exemplary embodiment illustrates the interchangeable lens 1 as an example of the lens apparatus. In some embodiments, the lens apparatus is a lens-integrated image capturing apparatus.

A first unit 10 is composed of the first lens unit L1, a first unit lens barrel 11, a first unit barrel 106, and a filter frame 107. The first unit lens barrel 11 holds the first lens unit L1. The first unit lens barrel 11 is fixed to the first unit barrel 106. The filter frame 107 is fixed to the first unit barrel 106. The first unit 10 has a configuration in which rollers (not illustrated) placed in the first unit barrel 106 engage with cam grooves formed in a cam ring 105 and with straight grooves formed in a guide barrel 104, and moves in the optical axis direction rotating about the optical axis of the cam ring 105.

A second unit lens barrel 21 holds the second lens unit L2. The second unit lens barrel 21 constitutes a part of an image stabilization unit 20. The image stabilization unit 20 holds the second unit lens barrel 21 movably in the direction orthogonal to the optical axis, and drives the second lens unit L2 using an actuator composed of a magnet and a coil to thereby correct image shake. The image stabilization unit 20 is fixed to the guide barrel 104 via rollers (not illustrated) placed in the image stabilization unit 20.

A third unit 30 is composed of the third lens unit L3, a third unit lens barrel 31, and a diaphragm unit 34. The third unit lens barrel 31 holds the third lens unit L3. The diaphragm unit 34 is a diaphragm unit to adjust the quantity of light, and is fixed to the third unit lens barrel 31. The third unit 30 is fixed to a rear unit base 81 via third unit rollers 32. The third unit rollers 32 are fixed to the third unit lens barrel 31 with third unit roller fastening screws 33.

A fourth unit 40 is composed of the fourth lens unit L4, a fourth unit lens barrel 41, a rack 42, and a rack spring 43. The fourth unit lens barrel 41 holds the fourth lens unit L4. The fourth unit 40 is linearly guided by guide bars 92 sandwiched between the rear unit base 81 and guide bar covers 93. The movement of the rear unit base 81 (first lens barrel) in the optical axis direction in zooming moves the fourth lens unit L4 in the optical axis direction. Further, the fourth lens unit L4 is driven by a fourth lens drive motor unit 96 in the optical axis direction to move with respect to the rear unit base 81. The rack 42 is urged in a direction orthogonal to the optical axis by the rack spring 43 to fit into the fourth lens drive motor unit 96. The rack 42 is also urged against the fourth unit lens barrel 41 in the optical axis direction by the rack spring 43. The fourth unit lens barrel 41 is urged against the guide bars 92 by the urging force of the rack spring 43 in a direction orthogonal to the optical axis. The fourth unit lens barrel 41 includes a scale (not illustrated) for detecting its position in the optical axis direction. An optical sensor for detecting the fourth lens position (not illustrated) opposed to the scale is fixed to the rear unit base 81 through a flexible printed circuit board. The scale and the optical sensor detect the position of the fourth unit lens barrel 41 relative to the rear unit base 81.

A fifth unit 50 is composed of the fifth lens unit L5 and a fifth unit lens barrel 51. The fifth unit lens barrel 51 holds the fifth lens unit L5. The fifth unit 50 is fixed to the rear unit base 81 via fifth unit rollers 52. The fifth unit rollers 52 are fixed with fifth unit roller fastening screws 53.

A sixth unit 60 is composed of the sixth lens unit L6, a sixth unit lens barrel 61, a rack 62 (connection member), and a rack spring 63 (first urging member). The sixth unit lens barrel 61 (second lens barrel) holds the sixth lens unit L6 (second lens unit). The sixth unit lens barrel 61 is linearly guided by the guide bars 92 sandwiched between the rear unit base 81 and the guide bar covers 93. The movement of the rear unit base 81 in the optical axis direction in zooming moves the sixth lens unit L6 in the optical axis direction. Further, the sixth lens unit L6 is driven by a sixth lens drive motor unit 95 (drive unit) to move in the optical axis direction. The rack 62 is urged in a direction orthogonal to the optical axis by the rack spring 63 to fit into the sixth lens drive motor unit 95. The rack 62 is also urged against the sixth unit lens barrel 61 in the optical axis direction by the rack spring 63. The sixth unit lens barrel 61 includes a scale (not illustrated) for detecting its position in the optical axis direction. An optical sensor for detecting the sixth lens position (not illustrated) opposed to the scale is fixed to the rear unit base 81 through a flexible printed circuit board. The scale and the optical sensor detect the position of the sixth unit lens barrel 61 relative to the rear unit base 81.

The rear unit 80 holds the third unit 30, the fourth unit 40, the fifth unit 50, and the sixth unit 60 as described above. The fourth lens drive motor unit 96 is fixed to the rear unit 80 with motor unit fastening screws 91. The sixth lens drive motor unit 95 is fixed to a motor movement base 85 with motor unit fastening screws 87. A motor movement base urging member 84 (second urging member) is disposed between the rear unit base 81 and the motor movement base 85, and the motor movement base urging member 84 and the movement base 85 are sandwiched between the rear unit base 81 and a motor movement base separation stopping screw 86. Rear unit rollers 82 are fixed to the rear unit base 81 with rear unit roller fastening screws 83. The rear unit 80 has a configuration in which the rear unit rollers 82 engage with the cam grooves formed in the cam ring 105 and with the straight grooves formed in the guide barrel 104 and integrally moves in the optical axis direction rotating about the optical axis of the cam ring 105.

The motor movement base 85 is fixed with a seventh unit connection screw 88. A motor movement base urging member 89 is fixed with a motor movement base urging member fastening screw 90. The motor movement base 85 includes protrusions (not illustrated) to engage with a straight groove 812 and a straight groove 813 formed in the rear unit base 81. The motor movement base 85 is guided along the straight groove 812 and the straight groove 813 to move in the optical axis direction with respect to the rear unit 80.

A seventh unit 70 is composed of the seventh lens unit L7 and a seventh unit lens barrel 71. The seventh unit lens barrel 71 (third lens barrel) holds the seventh lens unit L7 (third lens unit). Seventh unit rollers 72 are fixed to the seventh unit lens barrel 71 with seventh unit roller fastening screws 73. The seventh unit 70 has a configuration in which the seventh unit rollers 72 engage with the cam grooves formed in the cam ring 105 and with the straight grooves formed in the guide barrel 104 and integrally moves in the optical axis direction rotating about the optical axis of the cam ring 105. The seventh unit connection screw 88 fixed to the motor movement base 85 is fit in a long hole 710 formed in the seventh unit lens barrel 71. The seventh unit connection screw 88 fitted in the long hole 710 allows the motor movement base 85 and the sixth lens drive motor unit 95 to move in the optical axis direction integrally with the seventh unit 70.

The fourth lens drive motor unit 96 and the sixth lens drive motor unit 95 use vibration-type linear motors with piezoelectric elements. Each vibration-type linear motor includes a motor stator, a motor mover to move in the optical direction with respect to the motor stator by vibration excited by the motor stator and the piezoelectric element, and a motor output portion to move in the optical axis direction together with the motor mover. Thus, each motor unit according to the present exemplary embodiment can drive an optical element such as a lens with an actuator.

A lens mount 101 includes a bayonet portion used for detachably mounting the lens mount 101 on the camera body, and is fixed to a fixing barrel 102. An exterior barrel 103 is fixed to the fixing barrel 102. A zoom index and operation switches (not illustrated) are provided on the exterior barrel 103.

The guide barrel 104 is provided with a plurality of straight grooves extending in the optical axis direction. The cam ring 105 is rotatably fit to the outer surface of the guide barrel 104. The fixing barrel 102 fixes the guide barrel 104. An integrated circuit (IC) for driving the interchangeable lens 1, a microcomputer, and other devices are mounted on a printed circuit board 108. The printed circuit board 108 is fixed to the fixing barrel 102. A manual focus ring 109 is sandwiched between the front ring 110 and the fixing barrel 102, and is supported rotatably about the axis of the fixing barrel 102. When the manual focus ring 109 is rotated, the rotation is detected by a sensor (not illustrated) and in-focus control is performed based on the amount of rotation. A mount ring 112 is fixed by being sandwiched between the lens mount 101 and the fixing barrel 102. A mount rubber 113 is sandwiched between the inner surface of the mount ring 112 and the lens mount 101. A back lid 114 is fixed to the lens mount 101. A contact block 115 (contact portion) is electrically connected to the printed circuit board 108 with wiring (a flexible printed circuit board or the like) (not illustrated) and is fixed to the lens mount 101.

With the interchangeable lens 1 fixed to the camera body, the printed circuit board 108 for controlling the operation of each lens can communicate with the camera body through the contact block 115. The interchangeable lens 1 focuses light from a subject on the image sensor in the camera body, and converts the light into an electric signal, thereby creating a recorded image.

A zoom ring 111 is sandwiched between the fixing barrel 102 and the exterior barrel 103 and is supported rotatably about the axis of the fixing barrel 102. The zoom ring 111 is connected to the cam ring 105 via a key (not illustrated). The rotation operation of the zoom ring 111 rotates the cam ring 105, allowing the lens barrels described above to move in the optical axis direction. Varying intervals between the barrels enable images to be captured with focal lengths in the range from the wide-angle end to the telephoto end. The amount of rotation of the zoom ring 111 is detected by a sensor (not illustrated) and the signal is determined by the IC on the printed circuit board 108, which allows a focus control, an image-shake correction control, and a diaphragm drive control based on each focal length. The IC on the printed circuit board 108 controls the movements of the fourth lens unit L4 and the sixth lens unit L6 so that varying focus positions and various aberration amounts in zooming will be kept at certain values or less.

(Focus Lens Unit Drive Control)

Next, a drive control to be performed in zooming of the sixth lens unit L6 serving as the focus lens unit and data used in the drive control will be described. The following is a description of the sixth lens unit L6 and the sixth lens drive motor unit 95 for driving the sixth lens unit L6. In addition, the fourth lens unit L4 and the fourth lens drive motor unit 96 for driving the fourth lens unit L4 are similar to those.

FIGS. 6A and 6B are sectional views each illustrating a state where the rear unit 80 and the seventh unit 70 are located at the wide-angle end. FIGS. 7A and 7B are sectional views each illustrating a state where the rear unit 80 and the seventh unit 70 are located at the telephoto end. FIGS. 6A and 7A each illustrate an in-focus state at infinity. FIGS. 6B and 7B each illustrate an in-focus state at the closest distance. FIGS. 6A and 6B and FIGS. 7A and 7B each illustrate a sectional view taken along a line parallel to the optical axis.

Figure 8:
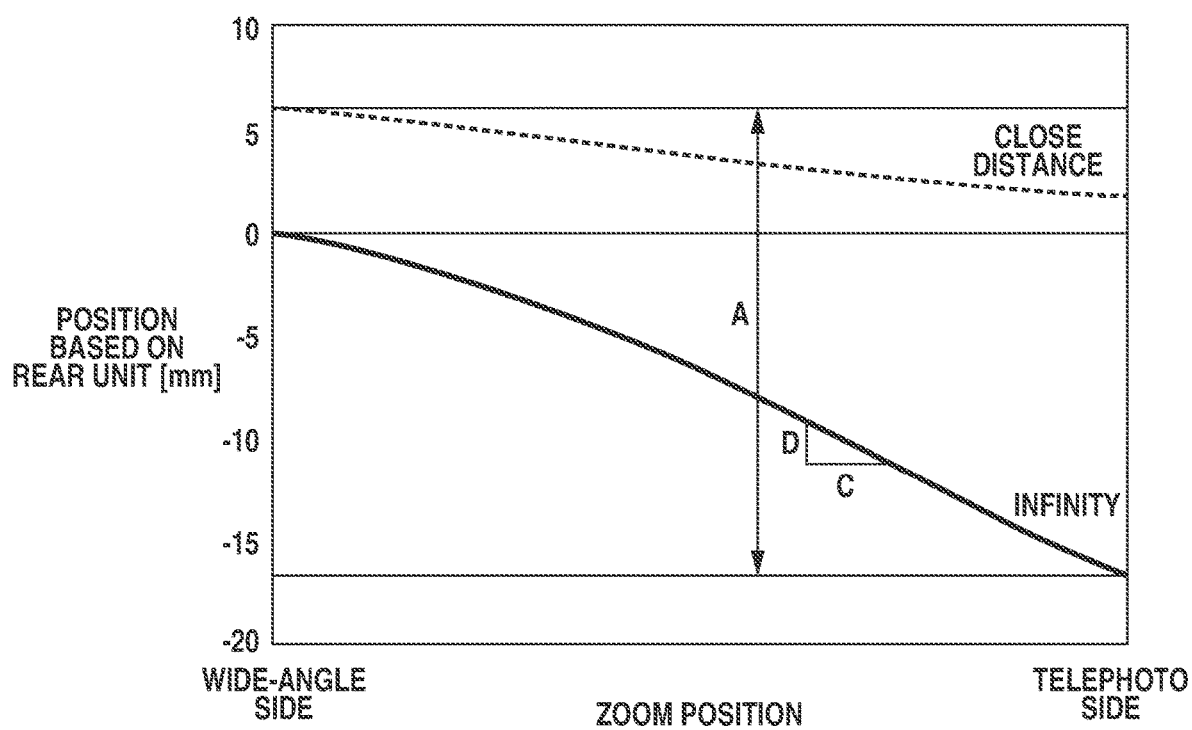
FIG. 8 is a graph illustrating in-focus positions of a sixth lens according to the exemplary embodiment.

FIG. 8 is a graph illustrating in-focus positions of the sixth lens unit L6 (hereinafter referred to as a sixth lens in-focus position) with respect to focal lengths (zoom position). An optical sensor for detecting sixth lens positions (not illustrated) is fixed to the rear unit base 81. The optical sensor for detecting sixth lens positions and the rear unit 80 move in the optical axis direction with respect to the lens mount 101 in zooming. Thus, FIG. 8 shows sixth lens in-focus positions (with respect to the position detecting sensor or the rear unit) detected by the optical sensor for detecting sixth lens positions, which are not sixth lens in-focus positions with respect to the lens mount 101.

In FIG. 8, the horizontal axis represents focal lengths (zoom position) drawn continuously in the range from the wide-angle end to the telephoto end. The vertical axis represents sixth lens in-focus positions with respect to the reference in-focus position (0) at infinity at the wide-angle end. The sixth lens in-focus positions on the imaging plane side are referred to as positive, and on the subject side are referred to as negative. The solid line represents sixth lens in-focus positions at infinity, and the broken line represents sixth lens in-focus positions at the closest distance. The lines of the sixth lens in-focus positions are equivalent to positional information detected by the optical sensor for detecting sixth lens positions (not illustrated), and are positional information used in feedback control of the sixth lens drive motor unit 95.

Figure 9:
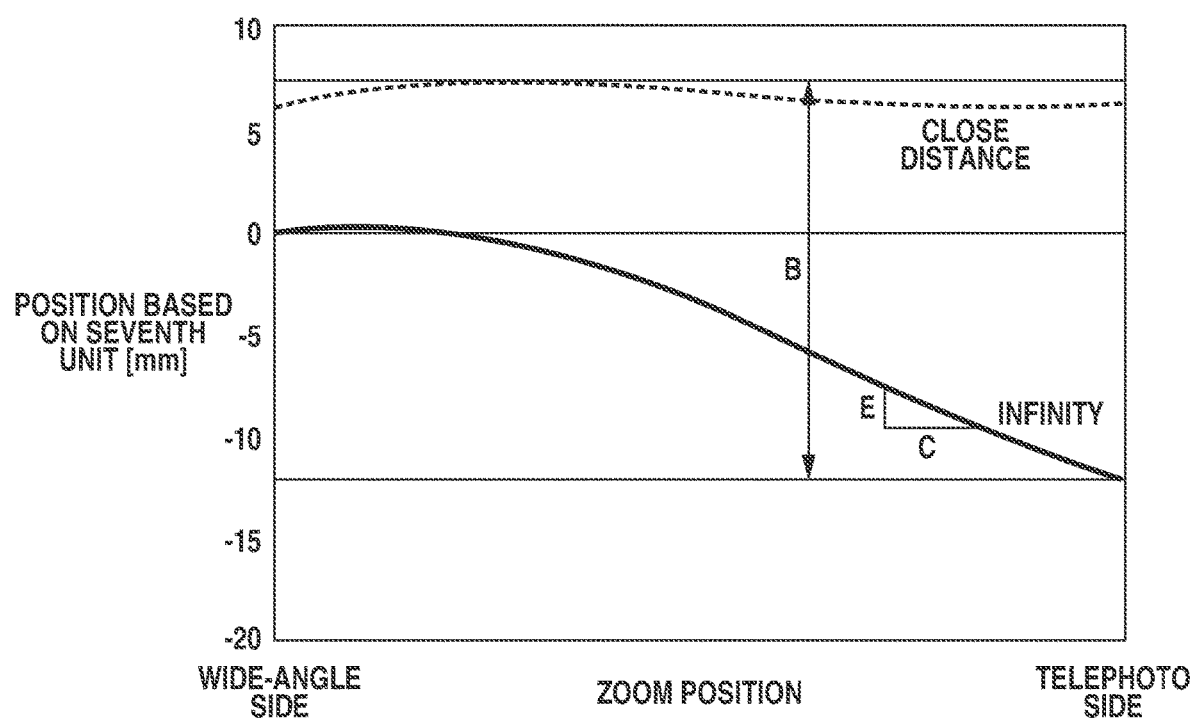
FIG. 9 is a graph illustrating in-focus positions of the sixth lens with respect to a seventh unit according to the exemplary embodiment.

FIG. 9 is a graph illustrating sixth lens in-focus positions with respect to zoom positions, as in FIG. 8. However, FIG. 9 illustrates sixth lens in-focus positions with respect to the seventh unit 70. The seventh unit 70, the rear unit base 81, and the sixth lens drive motor unit 95 integrally move in the optical axis direction. Thus, FIG. 9 also shows sixth lens in-focus positions with respect to the rear unit base 81 or the sixth lens drive motor unit 95. The horizontal axis, the vertical axis, the positive side, the negative side, the solid line, and the broken line illustrated in FIG. 9 are defined the same as those in FIG. 8.

FIG. 10 is a graph illustrating positions (dashed-dotted line) of the rear unit 80 and positions (dotted line) of the seventh unit 70 with respect to zoom positions. The differences between the positions of the rear unit 80 and the seventh unit 70 is represented by the solid line. The horizontal axis represents zoom positions drawn continuously in the range from the wide-angle end to the telephoto end. The vertical axis represents positions of the rear unit 80 and the seventh unit 70 with respect to the reference in-focus position (0) at infinity at the wide-angle end.

The differences between positions of the rear unit 80 and the seventh unit 70 as represented by the solid line in FIG. 10 are varying amounts in positions of the sixth unit detected by the optical sensor for detecting sixth lens positions (not illustrated) with the sixth lens drive motor unit 95 not driven in zooming. Thus, the configuration of assisting the movement of the sixth lens drive motor unit 95 (or the sixth lens unit L6) by the seventh unit 70 is defined as a focus assist configuration. In other words, the solid line illustrated in FIG. 10 represents the amounts of focus assist performed by the seventh unit 70 with respect to the rear unit 80. Data obtained by subtracting the focus assist amount illustrated in FIG. 10 from the sixth lens in-focus position with respect to the rear unit 80 illustrated in FIG. 8 corresponds to data illustrated in FIG. 9. Electronic cam data (i.e., data obtained based on the focus assist amount) indicating the sixth lens in-focus positions with respect to the sixth lens drive motor unit 95 illustrated in FIG. 9 is stored in a lens control unit of the printed circuit board 108. The lens control unit controls the driving of the sixth lens drive motor unit 95 using the stored electronic cam data in zooming.

(Beneficial Effects of Focus Assist)

A range "A" illustrated in FIG. 8 is a range for movement of the sixth lens unit L6. A range "B" illustrated in FIG. 9 is a range for driving the sixth lens unit L6 by the sixth lens drive motor unit 95. The focus assist configuration provides the relationship of range "A">range "B", reducing the motor drive amount. That allows the sixth lens drive motor unit 95 to be shortened in the optical axis direction, which contributes to a smaller size of the interchangeable lens 1. In other words, the movable range of the sixth lens unit L6 is extendable with a reduced motor drive amount.

The slope formed by a zoom range C and a position variation E illustrated in FIG. 9 (i.e., position variation E/zoom range C) is less than the slope formed by the zoom range C and a position variation D (i.e., position variation D/zoom range C) illustrated in FIG. 8. That allows a lower driving speed of the sixth lens drive motor unit 95. In other words, that reduces the driving speed of the sixth lens unit L6, which leads to a higher focus followability in zooming.

(Relationship between Actions of Forces in Focus Assist Configuration)

Next, a relationship between actions of forces related to the focus assist configuration according to the exemplary embodiment will be described.

Figure 11B:
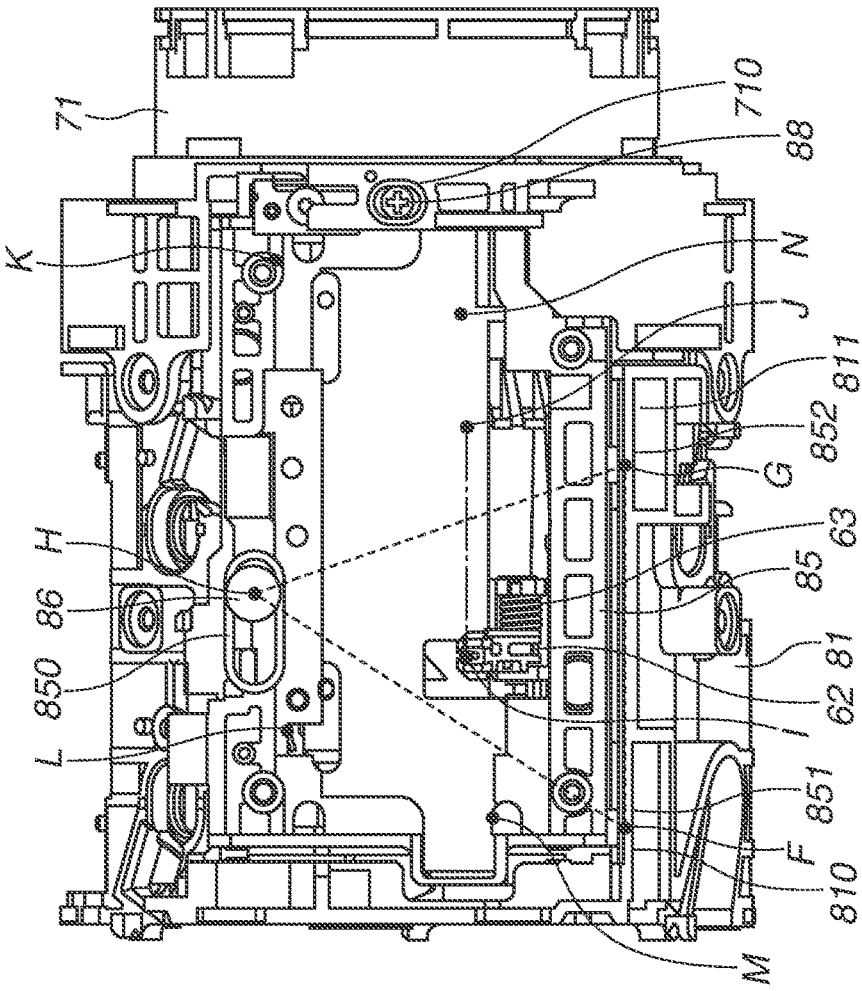
FIGS. 11A and 11B are top views each illustrating the rear unit and a motor movement base according to the exemplary embodiment.
Figure 11A:
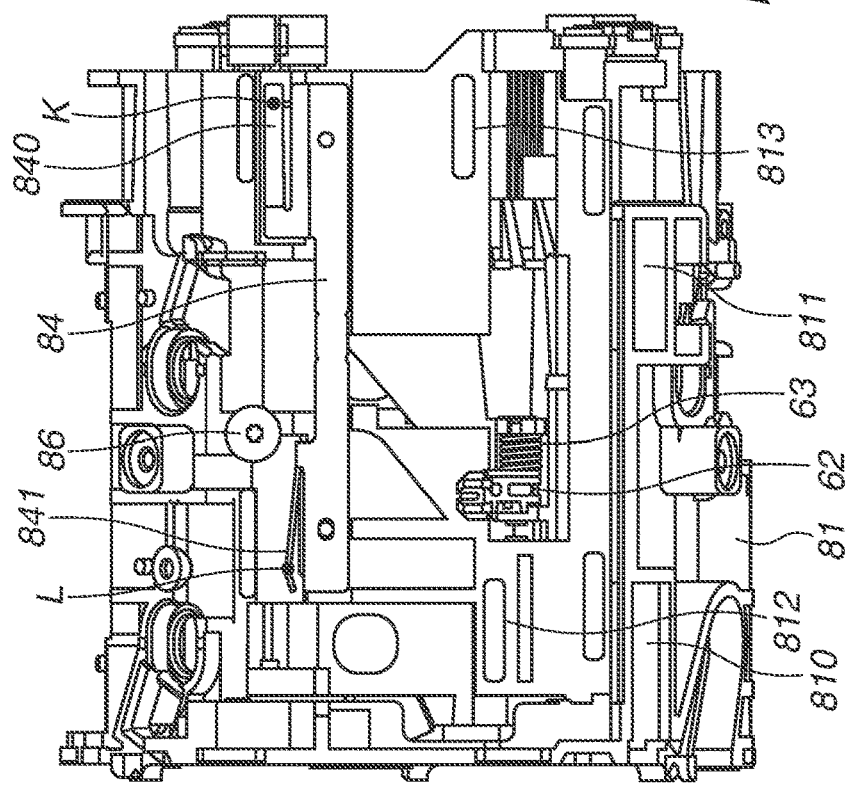

FIGS. 11A and 11B each illustrate the rear unit 80 and the motor movement base 85. FIGS. 11A and 11B also illustrate a positional relationship in the focus assist configuration. FIG. 11A is a top view of the rear unit 80. FIG. 11B is a top view of the rear unit 80 and the seventh unit 70. The components not used in the following description are omitted in FIGS. 11A and 11B.

Figure 12A:
FIGS. 12A and 12B are schematic diagrams each illustrating a relationship between action positions of forces in a focus assist configuration according to the exemplary embodiment.
Figure 12B:
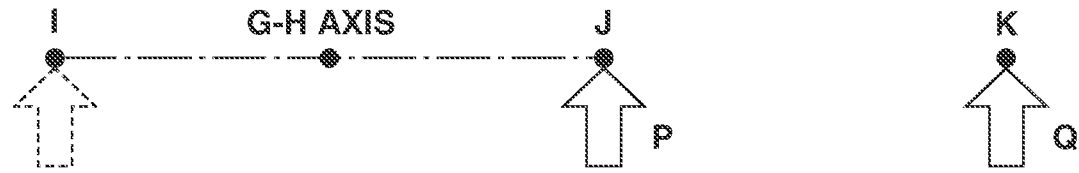

FIGS. 12A and 12B are schematic diagrams each illustrating a positional relationship between actions of forces in the focus assist configuration. FIG. 12A illustrates a state where an urging force is not generated by the motor movement base urging member 84, and FIG. 12B illustrates a state where an urging force is generated by the motor movement base urging member 84.

As described above, the motor movement base urging member 84 and the motor movement base 85 are sandwiched between the rear unit base 81 and the motor movement base separation stopping screw 86. As illustrated in FIG. 11A, the motor movement base urging member 84 includes an urging portion 840 and an urging portion 841 for urging the motor movement base 85 at a point K and a point L, respectively.

As illustrated in FIGS. 4 and 5, the motor movement base 85 includes a separation prevention portion 850, a separation prevention portion 851, and a separation prevention portion 852. The separation prevention portion 850 is urged by the rack spring 63 and the motor movement base urging member 84, which bring the separation prevention portion 850 into contact with the motor movement base separation stopping screw 86, which is fixed to the rear unit base 81. The separation prevention portion 851 and the separation prevention portion 852 form a hook shape and are provided on the rear unit base 81. The separation prevention portions 851 and 852 are inserted into a separation prevention hole 810 and a separation prevention hole 811, respectively. Thus, the configuration of each separation prevention portion formed on the motor movement base 85 inserted into the corresponding separation prevention hole serving as an opening formed in the rear unit base 81 allows the motor movement base 85 to be supported on the rear unit base 81. Further, in this configuration, the separation prevention portion 851 and the separation prevention portion 852 are in contact with the separation prevention hole 810 and the separation prevention hole 811 by urging forces received from the rack spring 63 and the motor movement base urging member 84. These separation prevention portions each function as a support portion that radially supports the motor movement base 85 on the rear unit base 81. Specifically, the motor movement base 85, which holds the sixth lens drive motor unit 95, is held on the plane defined by three portions: the separation prevention portion 850 (first support portion), the separation prevention portion 851 (third support portion), and the separation prevention portion 852 (second support portion).

In the present exemplary embodiment, the position of the separation prevention portion 850 is defined as a point H, the position of the separation prevention portion 851 is defined as a point F, and the position of the separation prevention portion 852 is defined as a point G. As positions where the sixth lens drive motor unit 95 receives an urging force from the rack spring 63 (positions where the rack 62 engages with the sixth lens drive motor unit 95), an in-focus position at infinity is defined as a point I and an in-focus position at the closest distance is defined as a point J.

As illustrated in FIGS. 11B and 12A, in the present exemplary embodiment, an urging force P received by the motor movement base 85 from the rack spring 63 moves between the point I and the point J across the G-H axis connecting the point G and the point H. Thus, the rack 62 serving as the connection member moves in a direction intersecting with the line connecting the first support portion and the second support portion as viewed in a direction orthogonal to the plane passing through the first support portion, the second support portion, and the third support portion. In this case, positive and negative values of the moment about the G-H axis are reversed before and after the urging force P moves across the G-H axis during movement between the point I and the point J. In other words, the moment about the G-H axis in the vicinity of the G-H axis is small, making the urging force against the motor movement base 85 unstable.

As a result, drive of the sixth lens drive motor unit 95 held on the motor movement base 85 in feedback control can cause vibration due to variable positions detected by the optical sensor for detecting sixth lens positions. Vibration makes it difficult to detect positions of the sixth lens unit L6 with high accuracy. In addition, noise from vibration impairs quality. To reduce vibration, keeping the moment about any axis, namely, the F-H axis, the F-G axis, or the G-H axis, in one direction constantly is effective.

With no urging force generated by the motor movement base urging member 84 as illustrated in FIG. 12A, the path between the point I and the point J should be inside the triangle formed by the point F, the point G, and the point H. That layout will cause a larger triangle formed by the point F, the point G, and the point H, leading to a longer overall length and a longer outer diameter of the interchangeable lens 1. Alternatively, the path between the point I and the point J should be outside the triangle formed by the point F, the point G, and the point H. That layout will cause a longer overall length of the interchangeable lens 1 due to an extended size in the optical axis.

In the present exemplary embodiment, as illustrated in FIGS. 11A and 11B and FIG. 12B, an urging force Q generated by the motor movement base urging member 84 acts on the point K. The position of the point K and the magnitude of the urging force Q are determined so that the moment by the action of the urging force Q on the point K will be greater than that by the action of the urging force P on the point I about the F-H axis. The distance from the line between the point G and the point H up to the point K is longer than either the distance from the point I to the line or the distance from the point J to the line. That means that the moment about the G-H axis points to the same direction constantly, making the urging condition against the motor movement base 85 stable. That configuration allows the triangle formed by the point F, the point G, and the point H and the path between the point I and the point J to be disposed in an overlapped manner, which leads to a reduction in the overall length and outer diameter of the interchangeable lens 1. Furthermore, that reduces vibration during the drive of the sixth lens drive motor unit 95 held on the motor movement base 85 in feedback control.

As described above, the motor movement base 85 is movable in the optical axis direction, being guided along the straight groove 812 and the straight groove 813 with respect to the rear unit base 81. The motor movement base urging member 84 urges the motor movement base 85 against the straight groove 812 and the straight groove 813. Urging the motor movement base 85 against the straight groove 812 and the straight groove 813 involves the action of force in a direction orthogonal to the groove direction. In terms of urging against the straight groove 812 and the straight groove 813, it is suitable that the urging force acts on an intermediate point between the straight groove 812 and the straight groove 813 in the optical axis direction. However, the movement range of the sixth unit lens barrel 61 and the motor movement base separation stopping screw 86 will be arranged at intermediate points between the straight groove 812 and the straight groove 813.

In the present exemplary embodiment, the motor movement base urging member 84 urges the motor movement base 85 at the point L and the point K in directions orthogonal to the groove direction of the straight groove 812 and the straight groove 813. At the point L, the motor movement base 85 is urged against the rear unit base 81 in a direction on the plane passing through the point F, the point G, and the point H. At the point L, the motor movement base 85 is also urged in a direction orthogonal to the groove direction of the straight groove 812 and the straight groove 813. At the point K, the motor movement base 85 is urged in a direction orthogonal to the groove direction of the straight groove 812 and the straight groove 813, and is also urged (urging force Q) in a direction substantially orthogonal to the plane passing through the point F, the point G, and the point H. The direction of the urging force generated at the point K corresponds to the direction in which the urging forces are combined. That configuration makes it possible to stably urge the motor movement base 85, without increasing the number of components. This results in contributing to a reduction in the overall length and outer diameter of the interchangeable lens 1.

In the present exemplary embodiment, the seventh unit connection screw 88 is fit in the long hole 710, allowing the motor movement base 85 and the sixth lens drive motor unit 95 to move in the optical axis direction integrally with the seventh unit 70. The cylindrical head portion of the seventh unit connection screw 88 is in line contact with the long hole 710. The area where the long hole 710 and the seventh unit connection screw 88 serving as a fixing member are in line contact with each other at least partially overlaps the sixth lens drive motor unit 95 serving as the drive unit as viewed in the optical axis direction. That configuration allows the force transmitted to the motor movement base 85 by the movement of the seventh unit 70 in zooming to be limited in the optical axis direction. The motor movement base 85 is movable in the optical axis direction with respect to the rear unit base 81 alone. Movement of the motor movement base 85 in a direction other than the optical axis direction will involve urging the motor movement base 85 more stably by the rack spring 63 and the motor movement base urging member 84.

On the other hand, a force transmitted to the motor movement base 85 in a direction other than the optical direction by movement of the seventh unit 70 in zooming would be counteracted by a larger force as the urging force generated by the rack spring 63 and/or the motor movement base urging member 84, leading to an increase in the size of units, resulting in an increase in the size of the interchangeable lens 1. Further, a configuration of connecting the motor movement base 85 and the seventh unit 70, such as a bayonet, would entail the forms of the seventh unit 70 and the rear unit 80 such that they will avoid contact each other in connection between the motor movement base 85 and the seventh unit 70, leading to an increase in the size of the interchangeable lens 1.

For those reasons, the configuration is suitable that the seventh unit connection screw 88 according to the present exemplary embodiment fitted in the long hole 710 allows the motor movement base 85 and the sixth lens drive motor unit 95 to move integrally with the seventh unit 70 in the optical axis direction.

As illustrated in FIG. 11B, the position of the straight groove 812 is defined as a point M and the position of the straight groove 813 is defined as a point N. In the present exemplary embodiment, the distances between the seventh unit connection screw 88 and the point M and between the seventh unit connection screw 88 and the point N in directions orthogonal to the groove direction of each straight groove are short. The distance between the seventh unit connection screw 88 and the plane passing through the point F, the point G, and the point H is short. In other words, the seventh unit connection screw 88 partially overlaps the motor movement base 85 or the sixth lens drive motor unit 95 as viewed on the image plane. That configuration reduces the effect of the force transmitted to the motor movement base 85 in the optical axis direction by the movement of the seventh unit 70 in zooming on the urging force that stably holds the motor movement base 85.

Figure 13:
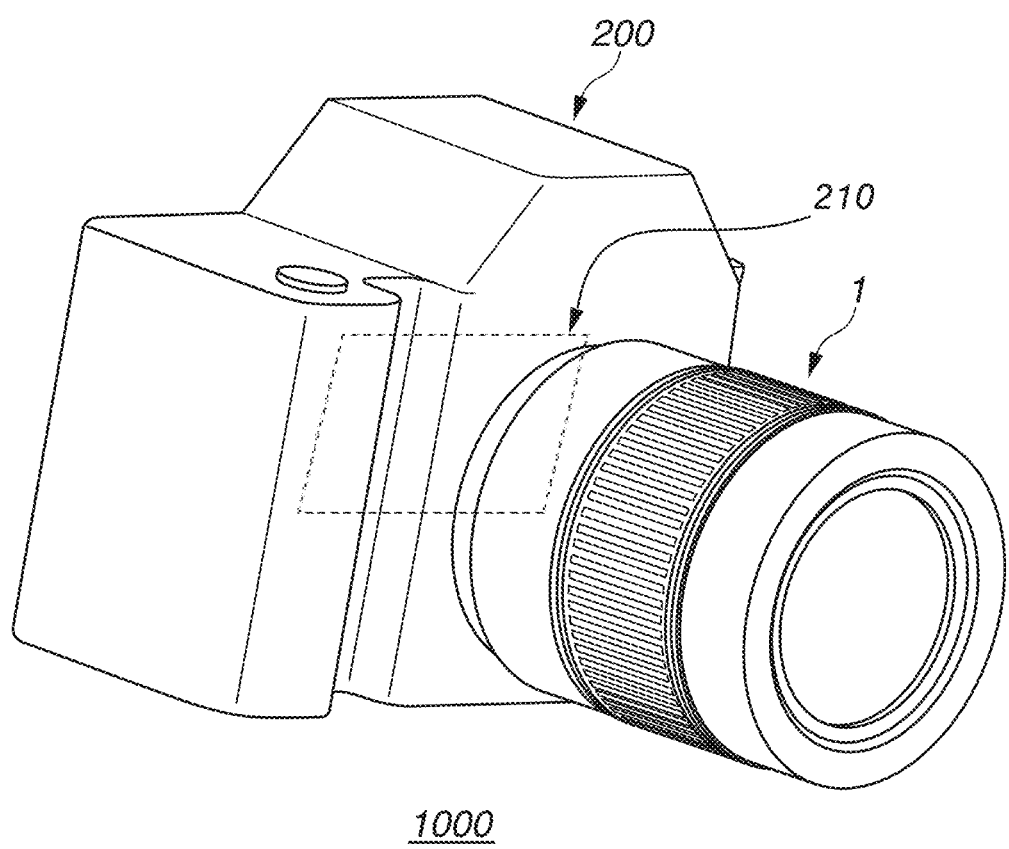
FIG. 13 is a perspective view illustrating a lens apparatus and an image capturing apparatus according to an exemplary embodiment of the disclosure.

FIG. 13 is a perspective view illustrating an image capturing apparatus 1000 including the interchangeable lens 1 according to the exemplary embodiment of the disclosure. The image capturing apparatus 1000 includes the interchangeable lens 1 serving as the lens apparatus, and a camera body 200 on which the interchangeable lens 1 is detachably mountable with the mount. The interchangeable lens 1 includes a control unit, a lens drive instruction unit, and a contact portion communicable with the camera body 200. The camera body 200 includes a control unit, an image sensor 210, and a contact portion communicable with the interchangeable lens 1. The image capturing apparatus 1000 according to an exemplary embodiment of the disclosure is not limited to an image capturing system. Examples of the image capturing apparatus 1000 include a lens interchangeable camera and a lens-integrated camera. Examples of the camera include an image capturing apparatus such as a digital still camera and a video camera.

The interchangeable lens 1 houses an image capturing optical system to form an optical image of an object (subject). An image capturing luminous flux from an object passes through the image capturing optical system to form an image on the light-receiving surface (imaging plane) of the image sensor. The image sensor photoelectrically converts the optical image of the object formed by the image capturing optical system.

According to an aspect of the embodiments, a compact lens apparatus is provided that allows the lenses to be stably driven a longer distance. While the exemplary embodiments of the disclosure have been described above, the disclosure is not limited to them and can be changed or modified in various ways within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-004607, filed Jan. 15, 2021, which is hereby incorporated by reference herein in its entirety.

What is claimed is:

1. A lens apparatus comprising:
a first lens unit configured to move in an optical axis direction in zooming;
a second lens unit configured to move in the optical axis direction in zooming and focusing;
a second lens barrel configured to hold the second lens unit;
a first lens barrel configured to hold the first lens unit and a guide bar, the guide bar being configured to hold the second lens barrel movably in the optical axis direction;
a drive unit configured to drive the second lens barrel in the optical axis direction in focusing;
a connection member configured to connect the second lens barrel and the drive unit;
a first urging member configured to urge the connection member against the drive unit and urge the second lens barrel against the guide bar;
a movement base configured to hold the drive unit and move the drive unit in the optical axis direction with respect to the first lens barrel; and
a second urging member configured to urge the movement base in a direction orthogonal to a plane passing through a first support portion, a second support portion, and a third support portion, the first support portion, the second support portion, and the third support portion being configured to support the movement base in a direction orthogonal to the optical axis on the first lens barrel,
wherein the connection member moves in a direction intersecting with a line connecting the first support portion and the second support portion as viewed in the direction orthogonal to the plane passing through the first support portion, the second support portion, and the third support portion,
wherein the second urging member acts on a point, and
wherein a position of the point and a magnitude of an urging force of the second urging member are determined so that a moment by the urging force of the second urging member about an axis connecting the first support portion and the second support portion is greater than a moment by an urging force of the first urging member about the axis connecting the first support portion and the second support portion.

2. The lens apparatus according to claim 1, wherein the second urging member urges the movement base against the first lens barrel in a direction along the plane passing through the first support portion, the second support portion, and the third support portion.

3. The lens apparatus according to claim 2,
wherein the first lens barrel has a straight groove along the optical axis direction,
wherein the movement base moves along the straight groove, and
wherein the second urging member urges the movement base against the straight groove in a direction orthogonal to the optical axis.

4. The lens apparatus according to claim 1, wherein the second urging member is disposed between the first lens barrel and the movement base and urges the movement base in the direction orthogonal to the optical axis.

5. The lens apparatus according to claim 1, further comprising:
a third lens unit configured to move in the optical axis direction in zooming; and
a third lens barrel configured to hold the third lens unit and move in the optical axis direction integrally with the movement base,
wherein the movement base or the third lens barrel has a long hole with a circumferential width larger than a width in the direction along the optical axis, and
wherein the lens apparatus further comprises a fixing member configured to be brought into contact with the long hole to fix the third lens barrel to the movement base.

6. The lens apparatus according to claim 5, wherein an area where the long hole and the fixing member are in contact with each other at least partially overlaps the drive unit as viewed in the optical axis direction.

7. The lens apparatus according to claim 1, wherein the second support portion and the third support portion are formed on the movement base and each are inserted into a corresponding opening formed in the first lens barrel.

8. The lens apparatus according to claim 1, wherein the first support portion is a screw for fixing the movement base and the first lens barrel.

9. The lens apparatus according to claim 1, further comprising a fixing barrel including a lens mount,
wherein the first lens barrel moves in the optical axis direction with respect to the fixing barrel in zooming.

10. An image capturing apparatus comprising:
a lens apparatus; and
an image sensor configured to receive light from the lens apparatus,
wherein the lens apparatus includes:
a first lens unit configured to move in an optical axis direction in zooming;
a second lens unit configured to move in the optical axis direction in zooming and focusing;
a second lens barrel configured to hold the second lens unit;
a first lens barrel configured to hold the first lens unit and a guide bar, the guide bar being configured to hold the second lens barrel movably in the optical axis direction;
a drive unit configured to drive the second lens barrel in the optical axis direction in focusing;
a connection member configured to connect the second lens barrel and the drive unit;
a first urging member configured to urge the connection member against the drive unit and urge the second lens barrel against the guide bar;
a movement base configured to hold the drive unit and move the drive unit in the optical axis direction with respect to the first lens barrel; and
a second urging member configured to urge the movement base in a direction orthogonal to a plane passing through a first support portion, a second support portion, and a third support portion, the first support portion, the second support portion, and the third support portion being configured to support the movement base on the first lens barrel in a direction orthogonal to the optical axis,
wherein the connection member moves in a direction intersecting with a line connecting the first support portion and the second support portion as viewed in the direction orthogonal to the plane passing through the first support portion, the second support portion, and the third support portion,
wherein the second urging member acts on a point, and
wherein a position of the point and a magnitude of an urging force of the second urging member are determined so that a moment by the urging force of the second urging member about an axis connecting the first support portion and the second support portion is greater than a moment by an urging force of the first urging member about the axis connecting the first support portion and the second support portion.

11. The image capturing apparatus according to claim 10, wherein the second urging member urges the movement base against the first lens barrel in a direction along the plane passing through the first support portion, the second support portion, and the third support portion.

12. The image capturing apparatus according to claim 10, wherein the second urging member is disposed between the first lens barrel and the movement base and urges the movement base in the direction orthogonal to the optical axis.

13. The image capturing apparatus according to claim 10, wherein the lens apparatus further comprises:
a third lens unit configured to move in the optical axis direction in zooming; and
a third lens barrel configured to hold the third lens unit and move in the optical axis direction integrally with the movement base,
wherein the movement base or the third lens barrel has a long hole with a circumferential width larger than a width in the direction along the optical axis, and
wherein the lens apparatus further comprises a fixing member configured to be brought into contact with the long hole to fix the third lens barrel to the movement base.

14. The image capturing apparatus according to claim 10, wherein the second support portion and the third support portion are formed on the movement base and each are inserted into a corresponding opening formed in the first lens barrel.

15. An image capturing system comprising:
a lens apparatus; and
an image capturing apparatus on which the lens apparatus is detachably mountable,
wherein the lens apparatus includes:
a first lens unit configured to move in an optical axis direction in zooming;
a second lens unit configured to move in the optical axis direction in zooming and focusing;
a second lens barrel configured to hold the second lens unit;
a first lens barrel configured to hold the first lens unit and a guide bar, the guide bar being configured to hold the second lens barrel movably in the optical axis direction;
a drive unit configured to drive the second lens barrel in the optical axis direction in focusing;
a connection member configured to connect the second lens barrel and the drive unit;
a first urging member configured to urge the connection member against the drive unit and urge the second lens barrel against the guide bar;
a movement base configured to hold the drive unit and move the drive unit in the optical axis direction with respect to the first lens barrel; and
a second urging member configured to urge the movement base in a direction orthogonal to a plane passing through a first support portion, a second support portion, and a third support portion, the first support portion, the second support portion, and the third support portion being configured to support the movement base in a direction orthogonal to the optical axis on the first lens barrel,
wherein the connection member moves in a direction intersecting with a line connecting the first support portion and the second support portion as viewed in the direction orthogonal to the plane passing through the first support portion, the second support portion, and the third support portion,
wherein the second urging member acts on a point, and
wherein a position of the point and a magnitude of an urging force of the second urging member are determined so that a moment by the urging force of the second urging member about an axis connecting the first support portion and the second support portion is greater than a moment by an urging force of the first urging member about the axis connecting the first support portion and the second support portion.

16. The image capturing system according to claim 15, wherein the second urging member urges the movement base against the first lens barrel in a direction along the plane passing through the first support portion, the second support portion, and the third support portion.

17. The image capturing system according to claim 15, wherein the second urging member is disposed between the first lens barrel and the movement base and urges the movement base in the direction orthogonal to the optical axis.

18. The image capturing system according to claim 15, wherein the lens apparatus further comprises:
   a third lens unit configured to move in the optical axis direction in zooming; and
   a third lens barrel configured to hold the third lens unit and move in the optical axis direction integrally with the movement base,
   wherein the movement base or the third lens barrel has a long hole with a circumferential width larger than a width in the direction along the optical axis, and
   wherein the lens apparatus further comprises a fixing member configured to be brought into contact with the long hole to fix the third lens barrel to the movement base.

19. The image capturing system according to claim 15, wherein the second support portion and the third support portion are formed on the movement base and each are inserted into a corresponding opening formed in the first lens barrel.

\* \* \* \* \*